(12) United States Patent
Chen et al.

(10) Patent No.: US 12,247,934 B2
(45) Date of Patent: Mar. 11, 2025

(54) POLARIZED, ENERGY DISPERSIVE X-RAY FLUORESCENCE SYSTEM AND METHOD

(71) Applicant: X-RAY OPTICAL SYSTEMS, INC., East Greenbush, NY (US)

(72) Inventors: Zewu Chen, Schenectady, NY (US); Fuzhong Wei, Altamont, NY (US); Joseph J. Spinazola, III, Troy, NY (US); Zhifan Gao, Suzhou (CN); Yaobiao Xia, Schenectady, NY (US)

(73) Assignee: X-RAY OPTICAL SYSTEMS, INC., East Greenbush, NY (US)

( * ) Notice: Subject to any disclaimer, the term of this patent is extended or adjusted under 35 U.S.C. 154(b) by 319 days.

(21) Appl. No.: 17/815,953

(22) Filed: Jul. 29, 2022

(65) Prior Publication Data
US 2024/0035990 A1    Feb. 1, 2024

(51) Int. Cl.
*G01N 23/223* (2006.01)
(52) U.S. Cl.
CPC ....... *G01N 23/223* (2013.01); *G01N 2223/20* (2013.01); *G01N 2223/652* (2013.01)
(58) Field of Classification Search
CPC ............. G01N 23/223; G01N 2223/20; G01N 2223/652; G01N 2223/076;
(Continued)

(56) References Cited

U.S. PATENT DOCUMENTS

| 5,175,755 A | 12/1992 | Kumakhov |
|---|---|---|
| 5,192,869 A | 3/1993 | Kumakhov |

(Continued)

FOREIGN PATENT DOCUMENTS

| CN | 108802081 A | 11/2018 |
|---|---|---|
| WO | WO 2013/063253 A1 | 5/2013 |

OTHER PUBLICATIONS

Chantler et al., "Characterization of the Titanium K Spectral Profile; Characterization of the Titanium K/beta Spectral Profile", Journal of Phys. B: Atomic Mol. Opt. Phys., vol. 46, No. 13, published Jun. 13, 2013 (10 pages) (Year: 2013).

(Continued)

*Primary Examiner* — Kiho Kim
(74) *Attorney, Agent, or Firm* — HESLIN ROTHENBERG FARLEY & MESITI PC

(57) ABSTRACT

An x-ray fluorescence system and method of fabrication are provided which include a titanium x-ray source, a focusing, doubly-curved lithium fluoride (LiF) crystal optic, and a detector. The titanium x-ray source includes a titanium target on which electrons impinge to generate a diverging x-ray beam with a titanium-based characteristic energy, and the focusing, doubly-curved LiF crystal optic monochromates and focuses the diverging x-ray beam from the titanium x-ray source to provide a monochromated and focused x-ray excitation beam directed to impinge on a sample. The crystal optic and the titanium x-ray source operate at a Bragg angle which facilitates polarization within the x-ray fluorescence system. The detector receives fluorescence from the sample induced by the x-ray excitation beam impinging thereon, with the fluorescence is indicative of a concentration of at least one element in the sample.

20 Claims, 11 Drawing Sheets

(58) Field of Classification Search
CPC ....... G01N 2223/204; G01N 2223/315; G21K 2201/062; G21K 2201/064
See application file for complete search history.

(56) References Cited

U.S. PATENT DOCUMENTS

| | | | |
|---|---|---|---|
| 5,497,008 | A | 3/1996 | Kumakhov |
| 5,570,408 | A | 10/1996 | Gibson |
| 5,604,353 | A | 2/1997 | Gibson et al. |
| 5,745,547 | A | 4/1998 | Xiao |
| 6,285,506 | B1 | 9/2001 | Chen |
| 6,317,483 | B1 | 11/2001 | Chen |
| 6,934,359 | B2 | 8/2005 | Chen et al. |
| 7,035,374 | B2 | 4/2006 | Chen |
| 7,072,439 | B2 | 7/2006 | Radley et al. |
| 7,110,506 | B2 | 9/2006 | Radley et al. |
| 7,209,545 | B2 | 4/2007 | Radley et al. |
| 7,257,193 | B2 | 8/2007 | Radley et al. |
| 7,515,684 | B2 | 4/2009 | Gibson et al. |
| 7,738,629 | B2 | 6/2010 | Chen |
| 7,738,630 | B2 | 6/2010 | Burdett et al. |
| 9,449,780 | B2 | 9/2016 | Chen |
| 10,317,350 | B2 | 6/2019 | Chen et al. |
| 10,705,033 | B2 | 7/2020 | Spinazola, III et al. |
| 10,976,273 | B2 * | 4/2021 | Yun ........................ H01J 35/18 |
| 2015/0043713 | A1 | 2/2015 | Chen et al. |
| 2015/0247811 | A1 | 9/2015 | Yun et al. |

OTHER PUBLICATIONS

International Search Report & Written Opinion for PCT Application No. PCT/US23023/066591, dated Aug. 23, 2023 (16 pages) (Year: 2023).

* cited by examiner

POLARIZED, ENERGY DISPERSIVE X-RAY FLUORESCENCE SYSTEM AND METHOD

BACKGROUND

Depending on the element of interest in a measurement system, trace element quantification at desired or required detection limits can be challenging. In one example of measurement technology, x-ray analysis is used across many tests and monitoring applications, such as environmental, consumer products, medical, pharmaceutical, and petroleum industries.

In one or more embodiments of x-ray technology, x-ray fluorescence (XRF) is used as an analytical technique by which a substance is exposed to a beam of x-rays to determine, for example, the presence and concentrations of certain components. In XRF, at least some of the elemental constituents of the substance exposed to x-rays can absorb x-ray photons and produce characteristic secondary fluorescence. These secondary x-rays are characteristic of the elemental constituents in the substance. Upon appropriate detection and analysis, the secondary x-rays can be used to characterize and/or quantify one or more of the elemental constituents in the sample.

Examples of XRF technology include U.S. Pat. Nos. 6,934,359 B2, and 7,072,439 B2, which are hereby incorporated by reference herein in their entirety, and assigned to X-Ray Optical Systems, Inc. These patents disclose monochromatic wavelength dispersive x-ray-fluorescence (MWD XRF) techniques and systems for analysis of samples, such as trace-level measurement of sulfur in petroleum products. U.S. Pat. No. 7,738,630 B2, which is incorporated herein by reference in its entirety, and also assigned to X-Ray Optical Systems, Inc., further discloses monochromatic excitation energy dispersive x-ray fluorescence (ME-EDXRF) techniques and systems for the analysis of samples, such as trace measurements of toxins in consumer products and other materials.

SUMMARY

Certain shortcomings of the prior art are overcome and additional advantages are provided through the provision, in one or more aspects, of an x-ray fluorescence system. The x-ray fluorescence system includes a titanium x-ray source, a focusing, doubly-curved lithium fluoride (LiF) crystal optic, and a detector. The titanium x-ray source includes a titanium target on which electrons impinge to generate a diverging x-ray beam with a titanium-based characteristic energy. The focusing, doubly-curved LiF crystal optical is included to monochromate and focus the diverging x-ray beam from the titanium x-ray source to provide a monochromated and focused x-ray excitation mean directed to impinge on a sample. The focusing, doubly-curved LiF crystal optical and titanium x-ray source operate at a Bragg angle which facilitates polarization within the x-ray fluorescence system. The detector receives fluorescence from the sample induced by the x-ray excitation beam impinging thereon, with the fluorescence being indicative of a concentration of at least one element in the sample.

In one or more embodiments, the focusing, doubly-curved lithium fluoride (LiF) crystal optic and the titanium x-ray source operate at a Bragg angle in the range of 42° to 48° to facilitate polarization within the x-ray fluorescence system.

In one or more implementations, the focusing, doubly-curved lithium fluoride (LiF) crystal optic of the x-ray fluorescence system includes <002> LiF crystals which operate with the x-ray titanium source at the Bragg angle to facilitate polarization within the x-ray fluorescence system. In one embodiment, the divergent x-ray beam from the titanium x-ray source monochromated and focused by the focusing, doubly-curved LiF crystal optic has a characteristic energy of approximately 4.5 KeV. Further, in one or more embodiments, the focusing, doubly-curved LiF crystal optic of the x-ray fluorescence system includes a logarithmic spiral doubly-curved crystal, or a Johann doubly-curved LiF crystal.

In one or more embodiments, the focusing, doubly-curved lithium fluoride (LiF) crystal optic of the x-ray fluorescence system is positioned so that the x-ray excitation beam impinges on the sample at an excitation beam angle in the range of 15° to 30°. In one embodiment, the focusing, doubly-curved LiF crystal optic is positioned so that the excitation beam angle is in the range of 18° to 23°.

In one or more embodiments, the detector of the x-ray fluorescence system includes an energy dispersive detector, and the titanium x-ray source, doubly-curved LiF crystal optic and sample are in a plane, and a center axis of the detector relative to the plane is within an angle to the plane in the range of 85° to 95° to facilitate suppressing scattering from the sample.

In one or more embodiments, the detector of the x-ray fluorescence system is positioned relative to the sample to minimize a gap therebetween so that the collection solid angle of the detector is greater than 1 steradian, and that the transmission loss at 1.74 keV is less than 30%. In one embodiment, the minimized gap is a minimized air gap between the sample and the detector.

In one or more embodiments, the x-ray fluorescence system further includes x-ray shielding between the optic and the sample, with the x-ray shielding having a tapered inner chamber sized and shaped to accommodate the monochromated and focused x-ray excitation beam directed to impinge on the sample.

In one or more implementations, at least one element in the sample includes at least one of sodium, magnesium, aluminum, silicon, phosphorus, sulfur, or chlorine.

In another aspect, a method of fabricating an x-ray fluorescence system is provided. The method includes providing a titanium x-ray source, the titanium x-ray source including a titanium target on which electrons impinge to generate a diverging x-ray beam with a titanium-based characteristic energy. The method also includes positioning a focusing, doubly-curved lithium fluoride (LiF) crystal optic relative to the titanium x-ray source to monochromate and focus the diverging x-ray beam from the titanium x-ray source to provide a monochromated and focused x-ray excitation beam directed to impinge on a sample. The focusing, doubly-curved LiF crystal optic and the titanium x-ray source operate at a Bragg angle which facilitates polarization within the x-ray fluorescence system. The method further includes providing a detector to receive fluorescence from the sample induced by the x-ray excitation beam impinging thereon, the fluorescence being indicative of a concentration of at least one element in the sample.

Additional features and advantages are realized through the techniques described herein. Other embodiments and aspects of the invention are described in detail herein and are considered a part of the claimed aspects.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Enhanced x-ray analysis measurement techniques are disclosed herein, which are particularly advantageous for detecting certain "light elements" in an x-ray fluorescence system, including, for instance, sodium, magnesium, aluminum, silicon, phosphorus, sulfur, and chlorine. In one or more embodiments, improved measurement performance is obtained by providing a unique polarized, energy dispersive x-ray fluorescence (polarized EDXRF) system which provides, for instance, similar detection level as other analytical techniques (e.g., WD XRF, ICP, . . . ), while maintaining the low cost and ease of use advantages of an energy-dispersive x-ray fluorescence (EDXRF) technique.

Figure 1:
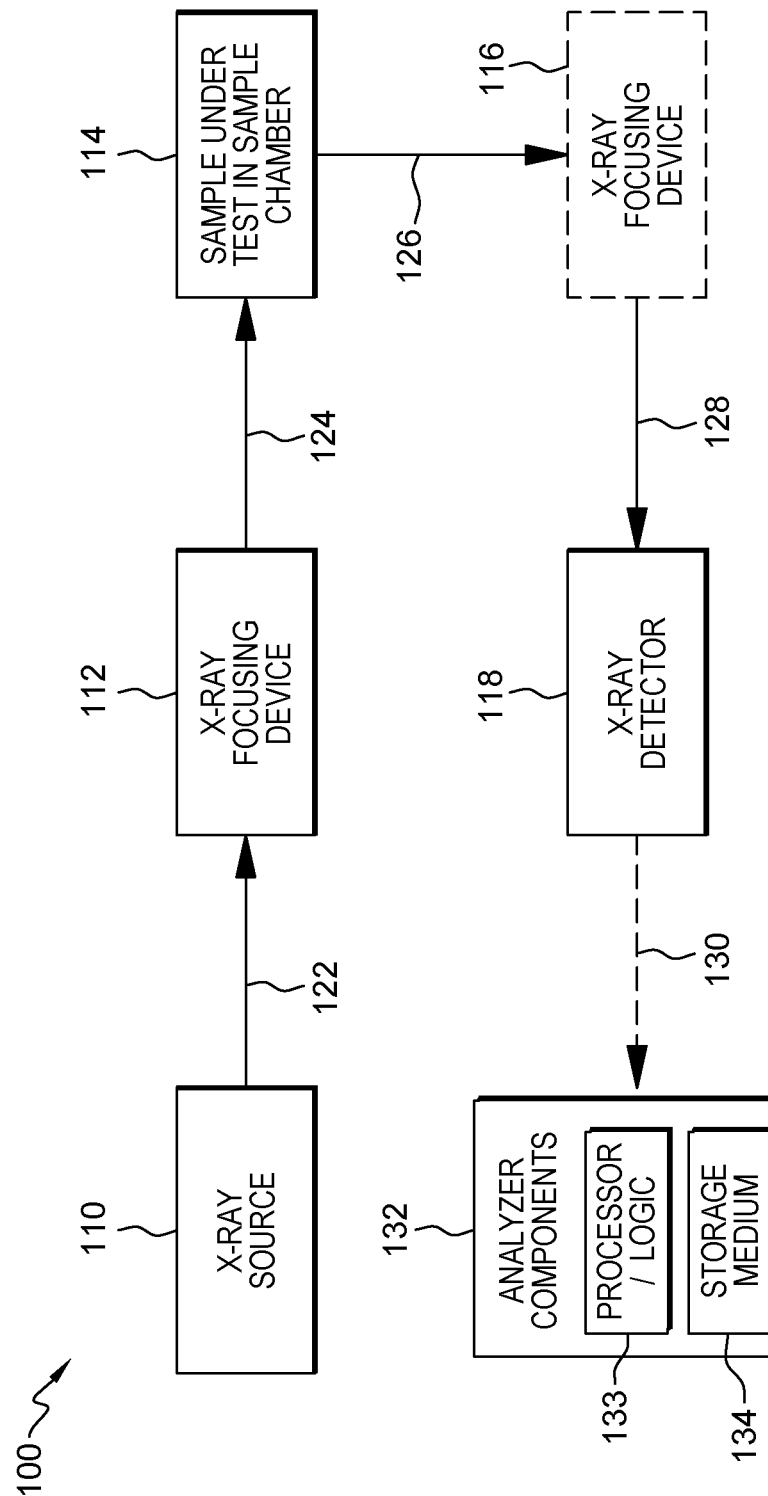
FIG. 1 is a functional block diagram of elements of exemplary x-ray fluorescence systems, including an exemplary polarized, energy dispersive x-ray fluorescence system, in accordance with one or more aspects of the present invention.

FIG. 1 is a high level, functional block diagram of exemplary XRF systems or analyzers 100 (including an exemplary polarized, energy dispersive x-ray fluorescence system, in accordance with one or more aspects of the present invention), used for exposing a sample to x-ray radiation to produce fluorescent radiation, which can then be detected and analyzed to determine a characteristic element of the sample. In one or more embodiments, the analyzer includes an x-ray source 110, an x-ray focusing device 112, a sample under test in a sample chamber 114, an optional x-ray focusing device 116, an x-ray detector 118, and one or more analyzer components 132 to provide an analytical result.

In operation, x-ray source 110 (for example, an x-ray tube) produces x-rays 122, which can be diffracted or focused by one or more x-ray focusing optics 112, such as discussed herein, into an excitation beam 124. When irradiated by excitation beam 124, one or more constituent elements of a sample, such as a sample in a sample chamber 114, are excited in such a fashion that the constituent element(s) fluoresce, that is, produce a secondary source of x-rays 126 due to excitation by x-ray excitation beam 124. In one or more embodiments, x-rays 126 are a diverging beam of x-rays, which can optionally be focused by x-ray focusing optics 116, for example, to help direct focused x-rays 128 towards x-ray detector 118 (in one embodiment). In one or more other embodiments, x-ray focusing device 116 is omitted, and the x-ray detector 118 is, for instance, an energy dispersive-type x-ray detector.

Depending on the implementation, x-ray detector 118 can be a proportional counter-type or a semiconductor type x-ray detector (e.g., silicon drift detector (SDD)), or any other suitable type of x-ray fluorescence detector known to one skilled in the art. In one specific embodiment, for a polarized, energy dispersive x-ray fluorescence (EDXRF) system such as disclosed herein, the detector can be, for instance, a carbon-coated graphene SDD detector. In one or more embodiments, x-ray detector 118 produces an electrical signal 130 containing one or more characteristics of the detected x-rays, which is forwarded to analyzer component(s) 132 for analysis, printout, or other display. Analyzer component(s) 132 can include a computer program product including, for instance, one or more non-transitory computer readable storage media 134 to store computer readable program code and/or processor/logic 133 thereon to provide and facilitate one or more aspects of the present invention.

X-ray focusing devices/optics 112, 116 for advanced XRF analyzers, including those discussed herein, can include, for example, curved crystal monochromating optics such as those disclosed in commonly assigned U.S. Pat. Nos. 6,285,506; 6,317,483; 7,035,374 B2; 7,738,629 B2; and PCT Publication WO 2013/063253 A1; and/or polycapillary optics such as those disclosed in commonly assigned U.S. Pat. Nos. 5,192,869; 5,175,755; 5,497,008; 5,745,547; 5,570,408; and 5,604,353. Optic/source combinations such as those disclosed in commonly assigned U.S. Pat. Nos. 7,110,506 B2; 7,209,545 B2; and 7,257,193 B2, are also useable, depending on the particular x-ray fluorescence system implementation. Each of the above-noted patents is hereby incorporated herein by reference in its entirety.

The following are examples of x-ray-optic-enabled analyzer engines.

MWD XRF X-Ray Analysis Engines:

X-Ray Optical Systems, Inc., has previously disclosed a Monochromatic Wavelength Dispersive X-Ray Fluorescence (MWD XRF) analyzer engine 200 using two monochromating optic sets (U.S. Pat. Nos. 6,934,359 B2 and 7,072,439 B2—hereby incorporated by reference herein in their entirety), as shown schematically in FIG. 2. The related SINDIE (Sulfur IN DIEsel) and CLORA (chlorine) product lines for the measurement of e.g., sulfur and chlorine in diesel fuel and other petroleum products revolutionized XRF and provide many advantages including: (1) signal/background (S/B) is improved due to monochromatic excitation of the sample by DCC1 112', i.e., the bremsstrahlung photons with energies under fluorescence peaks (which normally swamp the peaks of interest) can only reach the detector through scattering, therefore improving the S/B ratio dramatically compared to polychromatic excitation; (2) superior energy resolution—this eliminates all common interference problems and provides the physical basis for upstream applications; (3) inherent robustness and low maintenance—the analysis engine is low power, compact, with no moving parts or consumable gasses; and (4) unprecedented dynamic range, e.g., a quantification level from 0.3 ppm to 5% of sulfur in a sample.

Figure 2:
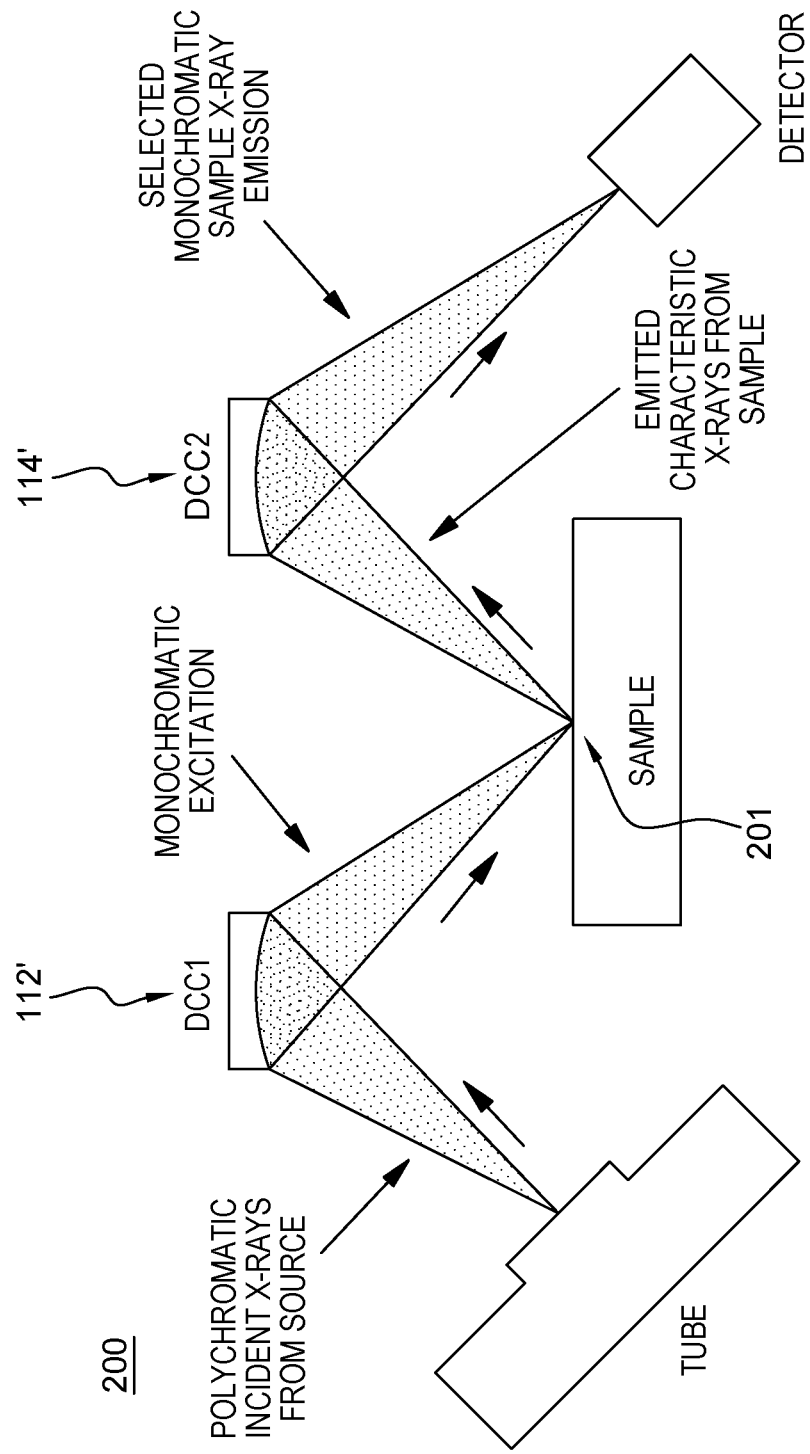
FIG. 2 is a schematic of an exemplary MWD XRF x-ray engine.
Figure 3:
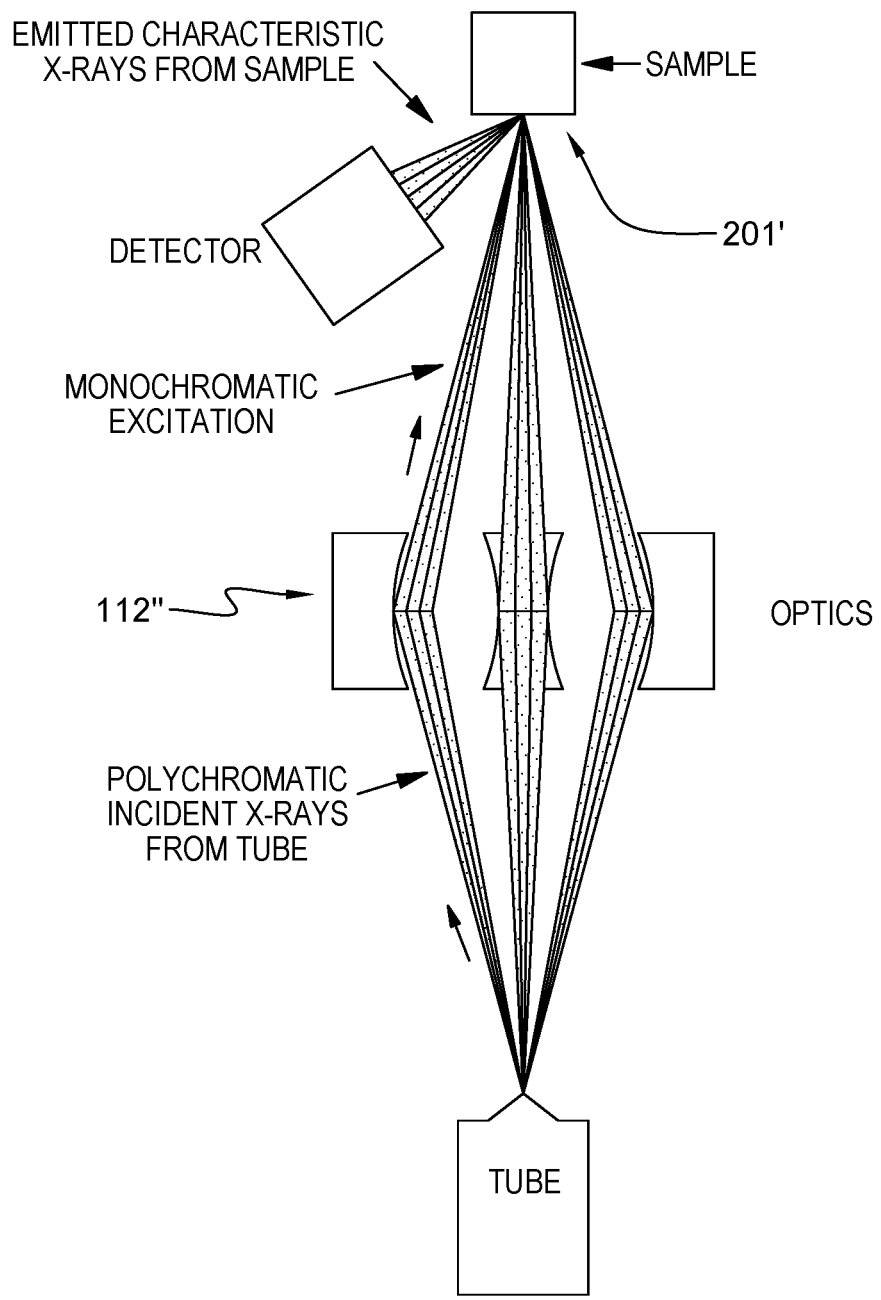
FIG. 3 is a schematic of an exemplary ME-EDXRF x-ray engine, which can be enhanced in accordance with one or more aspects of the present invention.

The MWD XRF engine 200, shown schematically in FIG. 2, includes curved monochromating optics 112' and 116' in the excitation and detection paths respectively, forming (in part) focal area or point 201 on the sample, which is the configuration of the SINDIE sulfur analyzer discussed above. However, in other implementations, an optic may only be present in one of these paths. For instance, an optic of any of the above-describe types may only be present in the excitation path, with the detection path including an energy dispersive detector. This is the configuration of an energy dispersive x-ray fluorescence (EDXRF) system, one embodiment of which is illustrated in FIG. 3, and discussed below.

ME EDXRF X-Ray Analysis Engine:

In one or more embodiments, monochromatic excitation, energy dispersive x-ray fluorescence (ME-EDXRF) analyzers can be used for x-ray fluorescence systems, in accordance with one or more aspects of the present invention. The technology is discussed in, e.g., U.S. Pat. No. 6,934,359 B2, entitled "XRF System Having Multiple Excitation Energy Bands In Highly Aligned Package", the entirety of which is hereby incorporated by reference herein. In one embodiment, this ME-EDXRF engine 300 involves monochromatic excitation known as high-definition x-ray fluorescence (HD XRF), as depicted schematically in FIG. 3. HD XRF, as used herein, refers to single-beam or multi-beam excitation, and generally means an x-ray fluorescence system with high-energy defining and spatial-defining properties. In FIG. 3, a multi-element analysis technique is illustrated, which can offer enhanced detection performance over traditional EDXRF or WD XRF. This technique applies state-of-the-art monochromating and focusing optics 112" illuminating a focal area or point 201' on a sample, enabling multiple select-energy excitation beams that efficiently excite a range of target elements in the sample. Monochromatic excitation dramatically reduces scattering background under the fluorescence peaks, greatly enhancing elemental detection limits and precision.

Polarized EDXRF X-Ray Analysis Engines:

By way of further example, certain novel polarized EDXRF systems and methods are disclosed herein (also referred to as high-definition polarized EDXRF systems and methods), and described below with reference to FIGS. 4A-7D. In the improved polarized x-ray fluorescence systems and methods disclosed, a focusing, doubly-curved crystal optic is utilized by way of example as the x-ray focusing device for focusing x-rays from the source, such as an x-ray tube source, to the sample. As noted herein, the optic is paired with a particular source in order to operate at a Bragg angle which facilitates polarization of the x-ray fluorescence system. For instance, in one or more embodiments, the x-ray focusing device is selected in combination with the x-ray source to attain a Bragg angle close to 45° in order to achieve a 90° reflection from the focusing device. Due to the polarization of the x-ray beam, scattering from the sample is suppressed with the detector positioned in a way so that the center axis of the detector is substantially perpendicular to a plane formed by the x-ray source-to-optic-to-focal-point of the sample. This particular arrangement of the detector relative to the plane defined by the source-optic-focal-point provides further advantages in the polarized EDXRF systems and methods disclosed herein by suppressing scattering from the sample.

In one or more implementations, the x-ray source is a titanium x-ray source, such as a titanium x-ray tube, which includes a titanium target (e.g., titanium anode) on which electrons impinge to generate, or form, a diverging x-ray beam with a titanium-based characteristic energy. In one or more embodiments, electrons impinge on a layer of titanium or a solid titanium anode to generate the diverging x-ray beam with a titanium-based characteristic energy. In one or more other embodiments, a rotational titanium target can be utilized for higher-power loading applications.

In combination with a titanium x-ray source, a focusing, doubly-curved crystal optic is provided to monochromate and focus x-rays from the x-ray source and provide the x-ray excitation beam directed towards the sample. For instance, in one or more embodiments, the optic is a focusing, doubly-curved lithium fluoride (LiF) crystal optic having LiF crystals, such as <002> LiF crystals. The targeted energy selected by the optic needs to be the strong characteristic line from the anode target material in order to maximize the performance of the optic. Advantageously, lithium fluoride (LiF) can increase the monochromatic beam flux for a curved crystal optic using a titanium x-ray source, and the combination provides a Bragg angle close to 45° in order to achieve a substantially 90° reflection from the optic to polarize the excitation beam. LiF has a wide rocking curve and can capture more photons from a larger source spot size, therefore, the diffraction efficiency from a larger source spot size is higher than that of other crystals, such as a silicon (Si) crystal. Thus, the diffraction flux can be much larger, such as compared to a silicon crystal, for a larger source spot size (e.g., greater than 50° micrometers). In addition, an LiF crystal optic will bend more readily than Si for the same thickness. The LiF optic can have a Johann geometry design, or a logarithmic spiral design, in one or more embodiments.

In one or more embodiments, depending on design parameters, the focusing, doubly-curved crystal optic can include multiple layers. By predetermining the crystalline orientation of each layer, the diffraction properties of the structure as a whole can be selected and optimized. Each individual crystalline layer provides an individual diffractive effect. These diffractive effects can be separately modeled, and their collective effect in the final optic can then be predicted and implemented according to final design criteria.

In another aspect, layers of differing material composition can be employed in the same optic, with either the same or differing crystalline orientations between the layers (or mixes thereof); and layers of similar (or the same) material composition can be employed, again with either the same or differing crystalline orientations between the layers (or mixes thereof). In any of these aspects, material-on-insulator can be used, or adhesive (e.g., epoxy) layers can be used to bind adjacent crystalline layers.

Figure 4A:
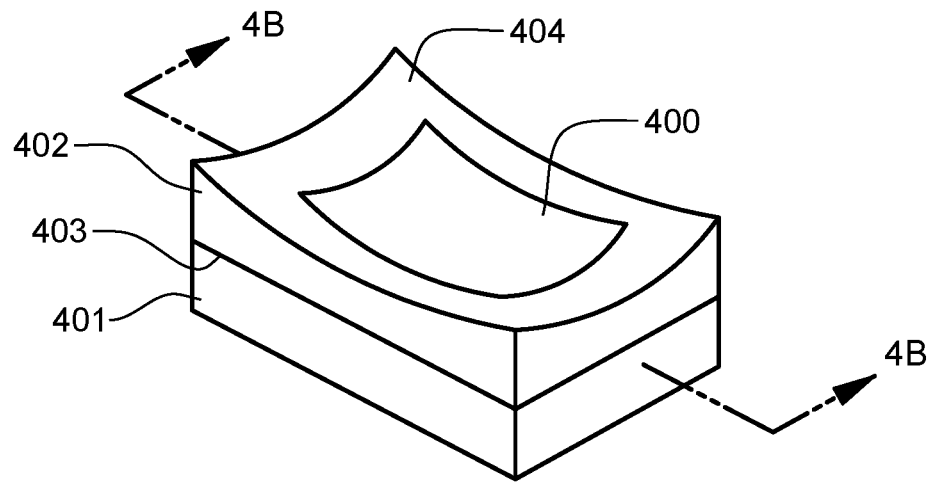
FIG. 4A depicts one embodiment of a point-focusing, doubly-curved monochromating crystal optic for an x-ray fluorescence system, in accordance with one or more aspects of the present invention.
Figure 4B:
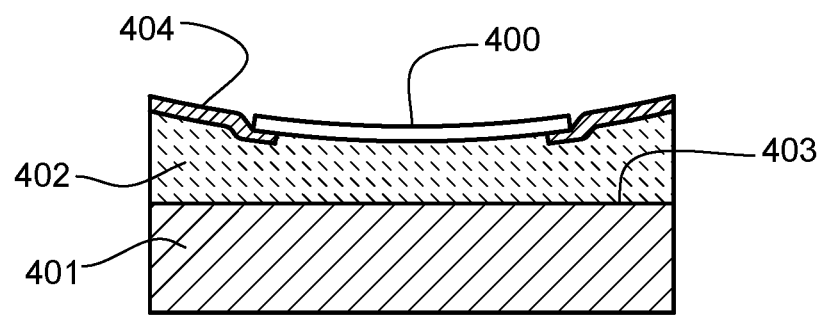
FIG. 4B is a cross-sectional, elevational view of the optic of FIG. 4A, taken along line 4B-4B thereof, in accordance with one or more aspects of the present invention.

The optic can be formed into a curved, monochromating optic, including a doubly-curved crystal (DCC) optic, one embodiment of which is depicted in FIGS. 4A & 4B, and described in detail in U.S. Pat. No. 6,285,506 B1, the entirety of which is hereby incorporated herein by reference.

In the embodiment of FIG. 4A, a doubly-curved optical device is depicted which includes a flexible layered optic 400, a thick epoxy layer 402, and a backing plate 401. The structure of the illustrated embodiment is shown further in the cross-sectional elevational view of FIG. 4B.

In this device embodiment, epoxy layer 402 holds and constrains flexible layer 400 to a selected geometry curvature. In one embodiment, the thickness of the epoxy layer can be greater than 20 micrometers and the thickness of the flexible layer can be greater than 5 micrometers. Further, the thickness of the epoxy layer is typically thicker than the thickness of the flexible layer. The flexible layer can be one of a large variety of materials, including those discussed herein, such as the LiF crystal optic embodiments described herein. The epoxy layer 402 can be a paste-type, with viscosity on the order of $10^3$ to $10^4$ poise, and 30 to 60 minutes POT life. The backing plate 401 can be a solid object that bonds well with the epoxy. The surface 403 of the backing plate can be flat (FIG. 4A) or curved, and its exact shape and surface finish are not critical to the shape and surface finish of the flexible layer. In the device of FIGS. 4A-4B, a specially prepared backing plate is not required.

Surrounding the flexible layer can be a thin sheet of protection material 404, such as a thin plastic, which can be used around the flexible layer edge (see FIG. 4A). The protection material protects the fabrication mold so that the mold is reusable, and would not be necessary for a mold that is the exact size or smaller than the flexible layer, or for a sacrificial mold.

The optics disclosed herein can be variously shaped, depending on the application, including but not limited to single directions of curvature (singly-curved crystals—SCCs), double directions of curvature (doubly-curved crystals—DCCs), and other designs. Doubly-curved optical devices, such as doubly-curved crystal (DCC) optics, can be used in material analysis to collect and focus x-rays from a large, solid angle, and to increase the usable flux from an x-ray source. The three-dimensional focusing of characteristic x-rays can be achieved by diffraction from a toroidal crystal used with a small x-ray source.

X-rays diverging from the source, and incident on the crystal surface at angles within the rocking curve of the crystals will be reflected efficiently to the focal or image point. The monochromatic flux density at the focal point for a DCC-based system is several orders of magnitude greater than that of conventional systems with higher power sources and similar source-to-object distances. This increase yields a very high sensitivity for use in many different applications, including for x-ray fluorescence, and more particularly, in a polarized EDXRF system and method such as disclosed herein.

Note that the layered optic structures disclosed offer the following advantages:
1. The optics mosaicity and rocking curves are controlled by layered orientation design.
2. The efficiency of the optic is increased—each layer (with its own custom orientation) can have its own field-of-view, resulting in a composite field-of-view, which increases efficiency and allows the optic to accommodate a larger source spot size. And, by accommodating a larger source spot size, system implementation is made easier.
3. The bandwidth (i.e., monochromization) of the optic can be controlled, and advantageously, increased in certain monochromating applications.

Advantageously, x-ray fluorescence systems, and in particular, EDXRF analysis systems such as described herein, can be further enhanced with polarization and further modifications, such as discussed below with reference to FIGS. 5A-7D.

In general, enhanced x-ray fluorescence systems and methods are provided herein, which include a titanium x-ray source, a focusing, doubly-curved lithium fluoride (LiF) crystal optic, and a detector. The titanium x-ray source includes a titanium target on which electrons impinge to generate a diverging x-ray beam with a titanium-based characteristic energy. The focusing, doubly-curved LiF crystal optic monochromates and focuses the diverging x-ray beam from the titanium x-ray source to provide a monochromated and focused x-ray excitation beam directed to impinge on a sample. The focusing, doubly-curved LiF crystal optic and the titanium x-ray source operate at a Bragg angle which facilitates polarization within the x-ray fluorescence system. The detector receives fluorescence received from the sample induced by the x-ray excitation beam impinging thereon, and the fluorescence is indicative of a concentration of at least one element in the sample.

In one or more embodiments, the focusing, doubly-curved lithium fluoride (LiF) crystal optic and the titanium x-ray source operate at a Bragg angle in the range of 42° to 48°, to facilitate polarization within the x-ray fluorescence system.

In one or more implementations, the focusing, doubly-curved lithium fluoride (LiF) crystal optic includes <002> LiF crystals, which operate with the x-ray titanium source at the Bragg angle to facilitate polarization within the x-ray fluorescence system. In one embodiment, the divergent x-ray beam from the titanium x-ray source monochromated and focused by the focusing, doubly-curved LiF crystal optic has a characteristic energy of approximately 4.5 KeV. In one or more implementations, the focusing, doubly-curved LiF crystal optic includes a logarithmic spiral, doubly-curved crystal, or a Johann doubly-curved LiF crystal.

In one or more implementations described herein, the focusing, doubly-curved lithium fluoride (LiF) crystal optic of the x-ray fluorescence system is positioned so that the x-ray excitation beam impinges on the sample at an excitation beam angle in the range of 15° to 30°, such as in the range of 18° to 23°, and more particularly, at approximately 20°, in one embodiment.

In one or more implementations, the detector of the x-ray fluorescence system includes an energy dispersive detector, and the titanium x-ray source, doubly-curved LiF crystal optic and sample are in a plane, and a center axis of the detector relative to the plane is within an angle to the plane in the range of 85° to 95° to facilitate suppressing scattering from the sample.

In one or more embodiments, the detector of the x-ray fluorescence system is positioned relative to the sample to minimize a gap between the detector and the sample so that the collection solid angle of the detector is greater than 1 steradian, and that the transmission loss at 1.74 keV is less than 30%. In one embodiment, the gap between the detector and the sample is an air gap, and the air gap is minimized between the detector and the sample such that the collection solid angle of the detector is greater than 1 steradian, and that the transmission loss at 1.74 keV is less than 30%.

In one or more embodiments, x-ray shielding is provided within the x-ray fluorescence system between the optic and the sample, with the x-ray shielding having a tapered inner chamber sized and shaped to accommodate the monochromated and focused x-ray excitation beam to impinge on the sample.

In one or more implementations, at least one element in the sample can be at least one of sodium, magnesium, aluminum, silicon, phosphorous, sulfur, or chlorine.

FIGS. 5A-5D depict a partial embodiment of an x-ray fluorescence system, generally denoted 500, in accordance with one or more aspects of the present invention. Referring collectively to FIGS. 5A-5D, x-ray fluorescence system 500 includes an x-ray source 510, which in one or more embodiments, is a titanium x-ray source having a titanium target (e.g., anode or film) on which electrons impinge to generate or form a diverging x-ray beam 511, with a titanium-based characteristic energy. For instance, when energetic electrons bombard an anode material, a characteristic of the material's x-rays will emit. The strongest characteristic x-ray line, Ka 1 lines of titanium atoms, have an energy of 4.511 KeV. The Ka 2 line is very close to Ka 1 line, and typically has an energy of 4.505 KeV. In one or more implementations, both lines can be used at the same time. In one or more embodiments, x-ray source 510 can be, or include, a vacuum-type x-ray tube (e.g., formed of glass or ceramic) having a transmission window through which diverging x-ray beam 511 is provided. In one embodiment, the x-ray tube houses an electron gun arranged opposite a high-voltage (HV) anode. When voltage is applied, the electron gun emits electronics in the form of an electron stream, i.e., an electron beam (e-beam), as known in the art. The HV anode acts as a target, with a source spot upon which the electron stream impinges for producing x-ray radiation, i.e., x-rays 511.

By way of example, the electron gun can be held at ground potential (zero volts), while the HV anode (e.g., titanium anode or target) is held at a high voltage potential, such as around 50 kV. As a result, the e-beam emitted from the electron gun at ground potential is electrically attracted to the surface of the HV anode, thereby producing the x-rays 511 from a source spot on the anode where the e-beam strikes the anode. X-rays 511 are subsequently directed through the transmission window of the vacuum-tight x-ray tube. The transmission window is typically formed of a material, such as beryllium (Be), which permits substantially unimpeded transmission of x-rays, while still maintaining the vacuum within the x-ray tube.

In one or more embodiments, a housing, such as illustrated in FIGS. 6C-7C, can at least partially enclose the x-ray tube and include an aperture aligned with the transmission window of the x-ray tube. By way of example, the aperture in the housing can be an open aperture in the housing, or an enclosed aperture defining an airspace. Upon transmission through the transmission window and aperture, the diverging x-ray beam 511 is collected by an optic 512. In one or more implementations, optic 512 can be centered about the aperture in the housing, and can be affixed to the exterior surface of the housing, or be partially disposed within the housing to reside within the aperture, if desired, or even separately supported from the housing, but aligned to the aperture in the housing.

As noted, in one or more embodiments, optic 512 can be, or include, a monochromating and focusing optic, such as the focusing, doubly-curved lithium fluoride (LiF) crystal optic described herein. In FIGS. 5A-5D, the optic is shown to be a focusing element, which is useful when x-ray source 510 is utilized for applications requiring a high-intensity, low-diameter spot. Focusing optic 512 collects x-ray radiation 511 and focuses the radiation into a polarized x-ray excitation beam 513 of converging x-rays. As noted herein, in one or more embodiments, a polarized excitation beam is attained by having a Bragg angle in a range of, for instance, 42°-48°. With lithium fluoride (LiF)<002>2-D spacing, and the characteristic titanium Ka energy level, the Bragg angle is approximately 43°, resulting in substantial polarization of the x-ray excitation beam. Further, the monochromatic beam provides a superior S/B ratio, and good excitation energy for x-ray analyzed light elements, such as sodium, magnesium, aluminum, silicon, phosphorous, sulfur, and/or chlorine. A focusing optic is also beneficial when a low-power x-ray source is to be employed in connection with an x-ray fluorescence system.

In one or more embodiments, the end of the HV anode opposite to the impingement surface can protrude through the body of the x-ray tube 510, and be mechanically and electrically connected to a base assembly 514. In one or more embodiments, base assembly 514 can include, for instance, a conductor disk electrically isolated from a base plate via a dielectric disk. One embodiment of such an anode and base assembly structure, referred to herein as an anode stack, is described in detail in U.S. Pat. No. 7,110,506 B2, entitled "Method and Device for Cooling and Electrically Insulating a High-Voltage, Heat-Generating Component Such as an X-ray Tube for Analyzing Fluid Streams", the entirety of which is hereby incorporated herein by reference.

In one or more embodiments, the conductor disk is mechanically and electrically connected to a high-voltage source (not shown) via an appropriate high-voltage lead. As result, the high-voltage potential is supplied to the conductor disk, and subsequently to the HV anode. Conversely, the base plate is held at ground potential, and the dielectric disk provides electrical isolation between the high-voltage conductor disk and the grounded base plate. A heat sink, such as a plurality of thermally conductive fins, can extend from the base of the anode stack in order to facilitate cooling of the x-ray source when in operation.

Figure 5A:
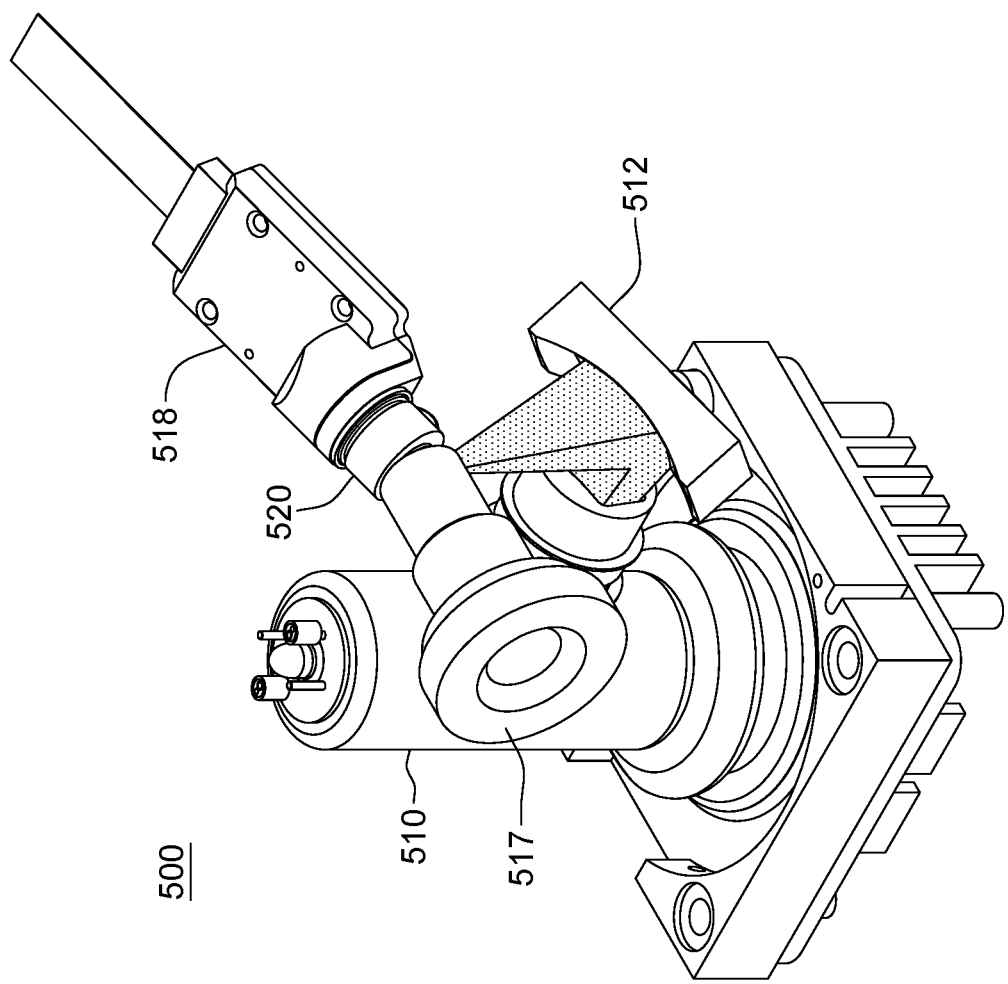
FIG. 5A is a partial illustration of one embodiment of a polarized, energy dispersive x-ray fluorescence system, in accordance with one or more aspects of the present invention.
Figure 5D:
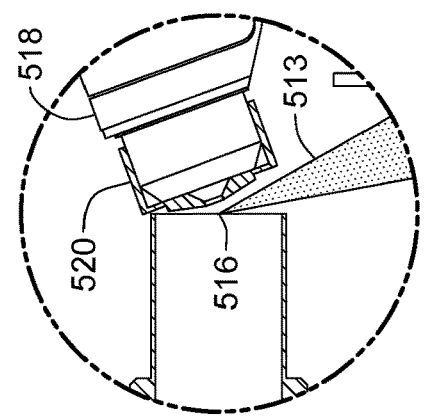
FIG. 5D is a partially enlarged depiction of the x-ray fluorescence system of FIG. 5C, taken within line 5D thereof, in accordance with one or more aspects of the present invention.
Figure 5C:
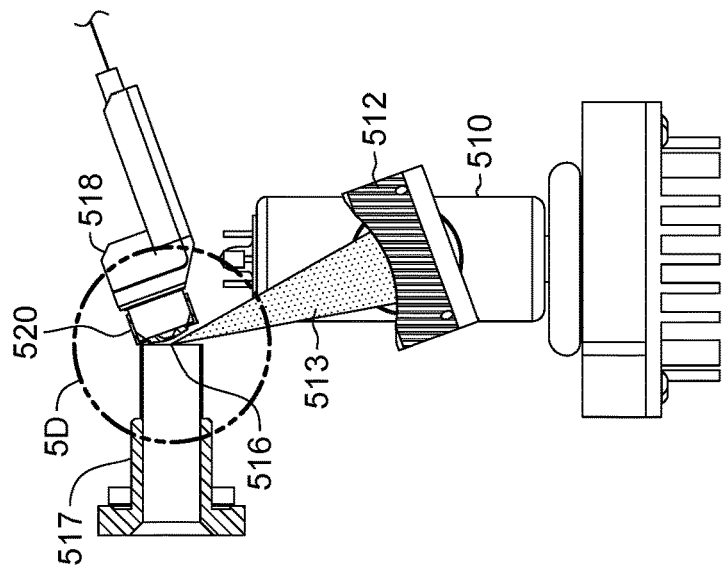
FIG. 5C is a partial cross-sectional elevational view of the x-ray fluorescence system of FIG. 5B, taken along line 5C-5C thereof, in accordance with one or more aspects of the present invention.
Figure 5B:
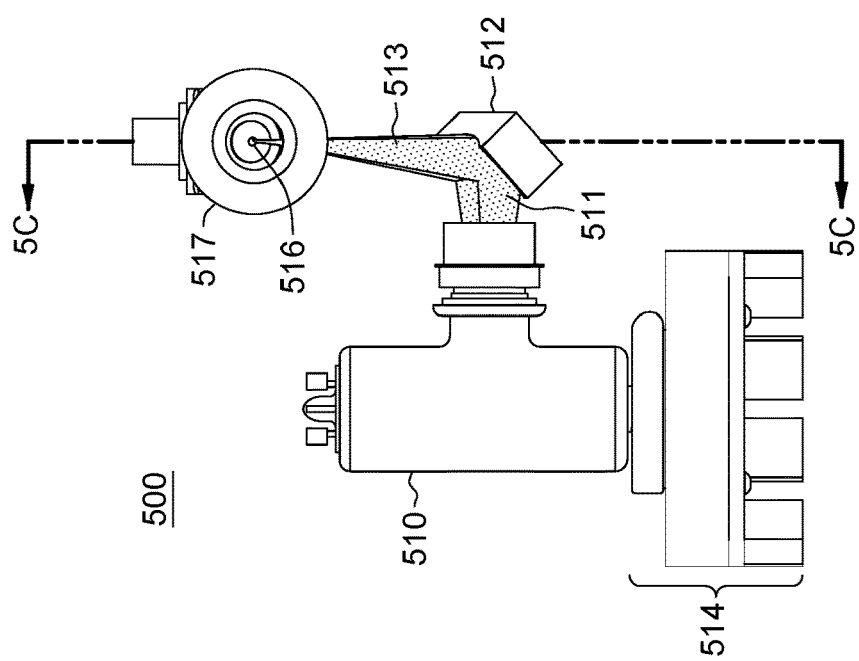
FIG. 5B is an elevational depiction of the x-ray fluorescence system of FIG. 5A, in accordance with one or more aspects of the present invention.

As shown in FIGS. 5A-5D, the converging x-ray excitation beam 513 is directed onto a sample 516 within a focal area or point on the sample. In one or more embodiments, the sample is within, for instance, a sample chamber 517 of a sample carrier, such as a carrier for presenting a pressurized sample to a sample focal area of the analyzer. An x-ray detector 518 is oriented and positioned (that is, closely coupled as described herein) relative to sample 516 to receive fluorescence from the sample induced by the x-ray excitation beam 513 impinging thereon, with the fluorescence being indicative of a concentration of at least one element in the sample. In one or more embodiments, detector 518 is an energy dispersive detector, such as an energy dispersive SDD detector. In one or more embodiments described herein, detector 518 is closely coupled to sample 516 meaning that the detector is positioned relative to the sample to minimize a gap between the detector and the sample to ensure, for instance, the collection solid angle of the detector is greater than 1 steradian, and that the transmission loss at 1.74 keV is less than 30%. In one or more embodiments, the gap is an air gap between the sample and the detector. In one or more other embodiments, the gap includes, and/or is filled with, one or more gases (e.g., helium or hydrogen) to facilitate transmission. Further, in one or more other embodiments, the gap can be a vacuum gap. In the embodiment illustrated, detector 518 includes an opening with a cover or lens 520 protecting the opening. As illustrated in FIG. 5D, in one or more implementations, cover or lens 520 of detector 518 is closely positioned or coupled to sample 516, while still allowing for the converging x-ray excitation beam 513 to impact on the focal area or point to induce fluorescence. In one or more implementations, a center axis of detector 518 (i.e., the detector opening) is substantially perpendicular to the plane formed by the x-ray source, optic, and sample spot. For instance, in one embodiment, the center detect axis of the detector is in the range of 850-95° of the plane, which advantageously suppresses scattering from the sample.

Figure 6A:
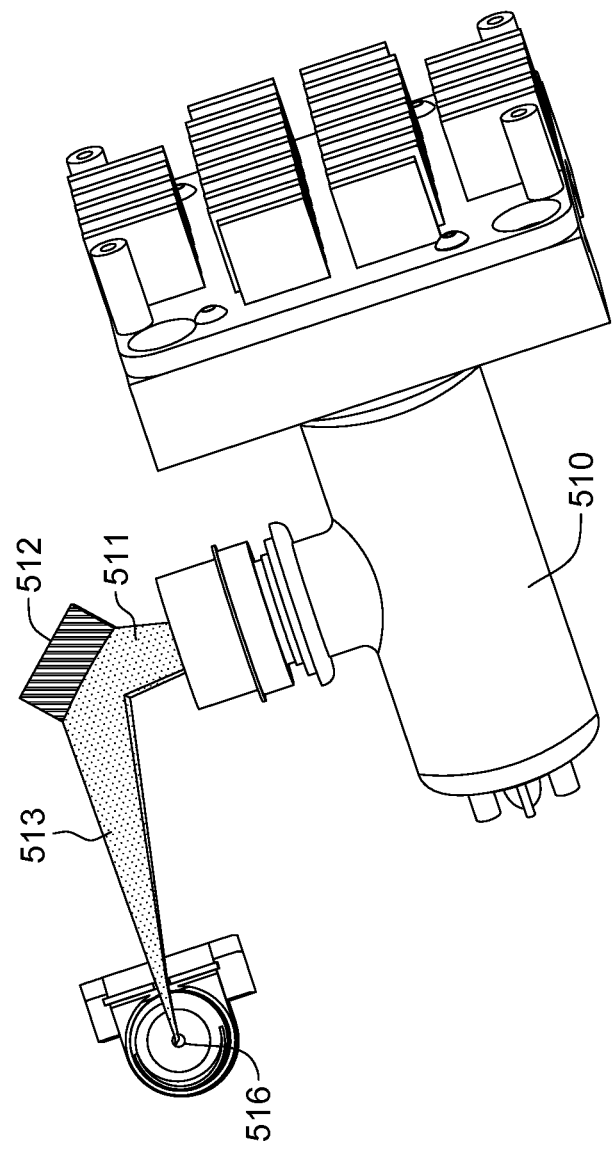
FIG. 6A is a partial depiction of the x-ray fluorescence system of FIGS. 5A-5D, highlighting the substantially 90° reflection of the diverging x-ray beam to the monochromated and focused x-ray excitation beam directed by the optic towards the sample, in accordance with one or more aspects of the present invention.
Figure 6B:
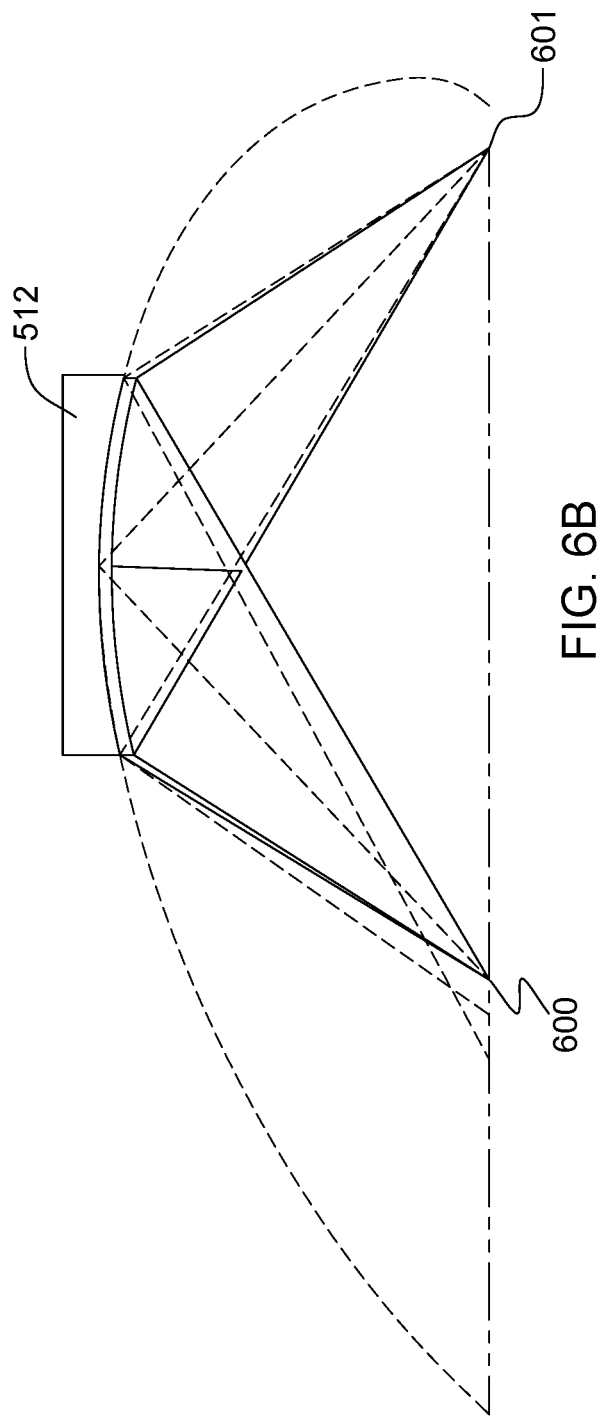
FIG. 6B schematically illustrates a log spiral of a 4.51 KeV focusing, lithium fluoride (LiF) crystal optic, which can be used in a polarized x-ray fluorescence system geometry, in accordance with one or more aspects of the present invention.
Figure 6C:
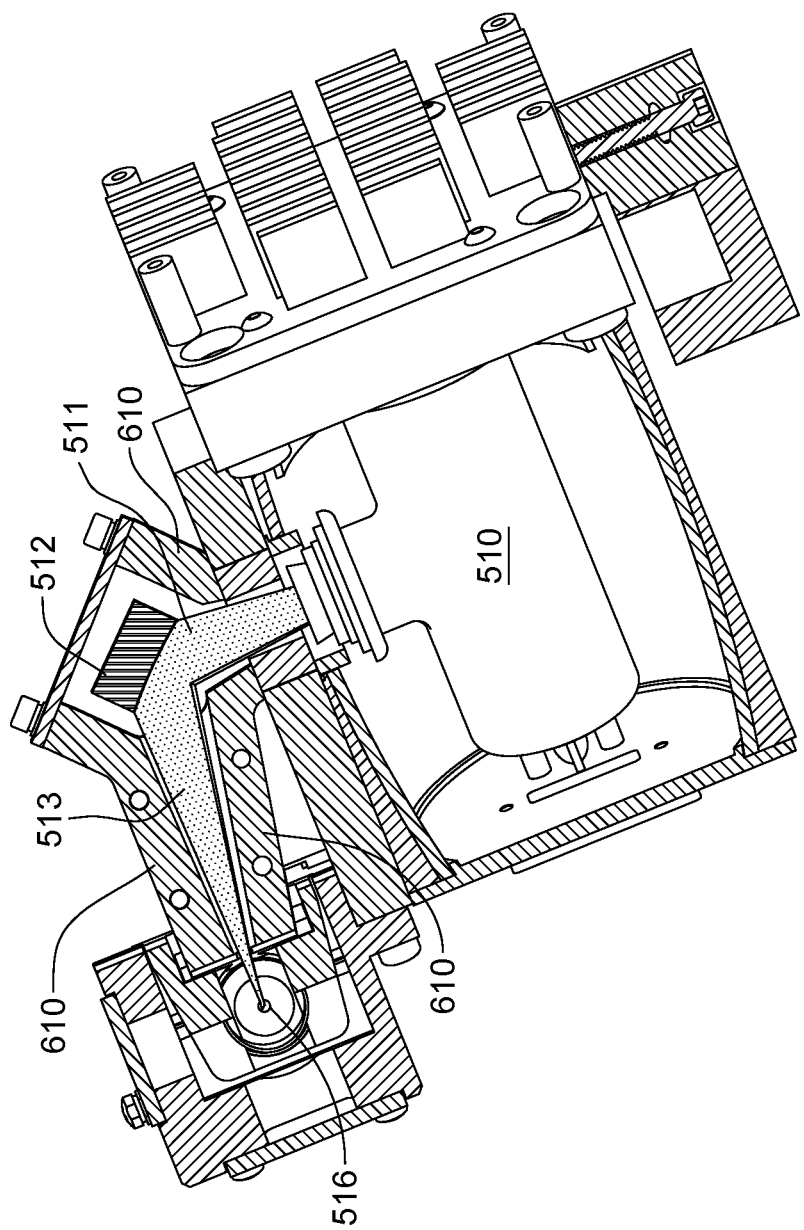
FIG. 6C is a further partial cross-sectional elevational view of the x-ray fluorescence system of FIGS. 5A-6A, depicting a close coupling of x-ray shielding provided around the x-ray pathway from an x-ray source output, to the optic, and then to the sample, in accordance with one or more aspects of the present invention.

Further details of the polarized, energy dispersive x-ray fluorescence system embodiment of FIGS. 5A-5D are illustrated in FIGS. 6A-6C.

Referring to FIG. 6A, and as noted with reference to FIGS. 5A-5D, an x-ray source 510, such as a titanium x-ray source, provides a divergent x-ray beam 511, with a titanium-based characteristic energy, such as 4.5 KeV Ti Ka x-rays, to monochromating and focusing optic 512. The x-ray source, such as titanium x-ray tube, is aligned to optic 512, such as a focusing, doubly-curved lithium fluoride (LiF) crystal optic of the Johann or spiral geometry (such as shown in FIG. 6B) formed from <001> or <002> LiF crystals. Optic 512 monochromates and focuses the diverging x-ray beam into a monochromated and focused x-ray excitation beam 513 for impinging on sample 516. The choice of a titanium target or anode combined with a LiF doubly-curved crystal optic advantageously enhances operation by providing a 43.05° Bragg angle, which allows the design to substantially function as a polarizer in the x-ray fluorescence system, along with providing the other benefits of a focusing, doubly-curved crystal optic.

As illustrated in FIG. 6B, optic 512 is configured, in one embodiment, as a DCC optic, log spiral, 4.51 KeV focusing, lithium fluoride (LiF) crystal optic which enables a polarized geometry, with the focusing, doubly-curved LiF crystal optic and the titanium x-ray source operating at a Bragg angle in the range of 42° to 48° to facilitate beam polarization. As illustrated in FIGS. 6A & 6B, in one embodiment, a center axis of the diverging x-ray beam from a target spot 600 to optic 512, and a center axis of the x-ray excitation beam from optic 512 to sample spot 601, defines an approximately 90° beam path to and from the optic.

FIG. 6C illustrates a partial cross-sectional view of an assembled polarized, energy dispersive x-ray fluorescence system, such as disclosed herewith. As illustrated, in one embodiment, the x-ray fluorescence system includes x-ray shielding 610 in part between optic 512 and sample 516. X-ray shielding 610 is configured with a tapered inner chamber that is sized and shaped to accommodate the monochromated and focused x-ray excitation beam 513 directed towards sample 516 from optic 512. As illustrated, in one or more embodiments, x-ray shielding 610 is also configured to accommodate diverging x-ray beam 511 between the output of titanium x-ray source 510 and optic 512. By sizing and shaping the inner chamber(s) to accommodate the diverging x-ray beam 511, as well as the focused x-ray excitation beam 513, background noise is reduced. To further reduce system background, a tight aperture can be placed over both the end of the excitation beam 710, near where impinging on the sample as illustrated in FIG. 7D, as well as at the detector opening 720 to minimize, for instance, the impact of argon scattering to the background of the system.

Figure 7A:
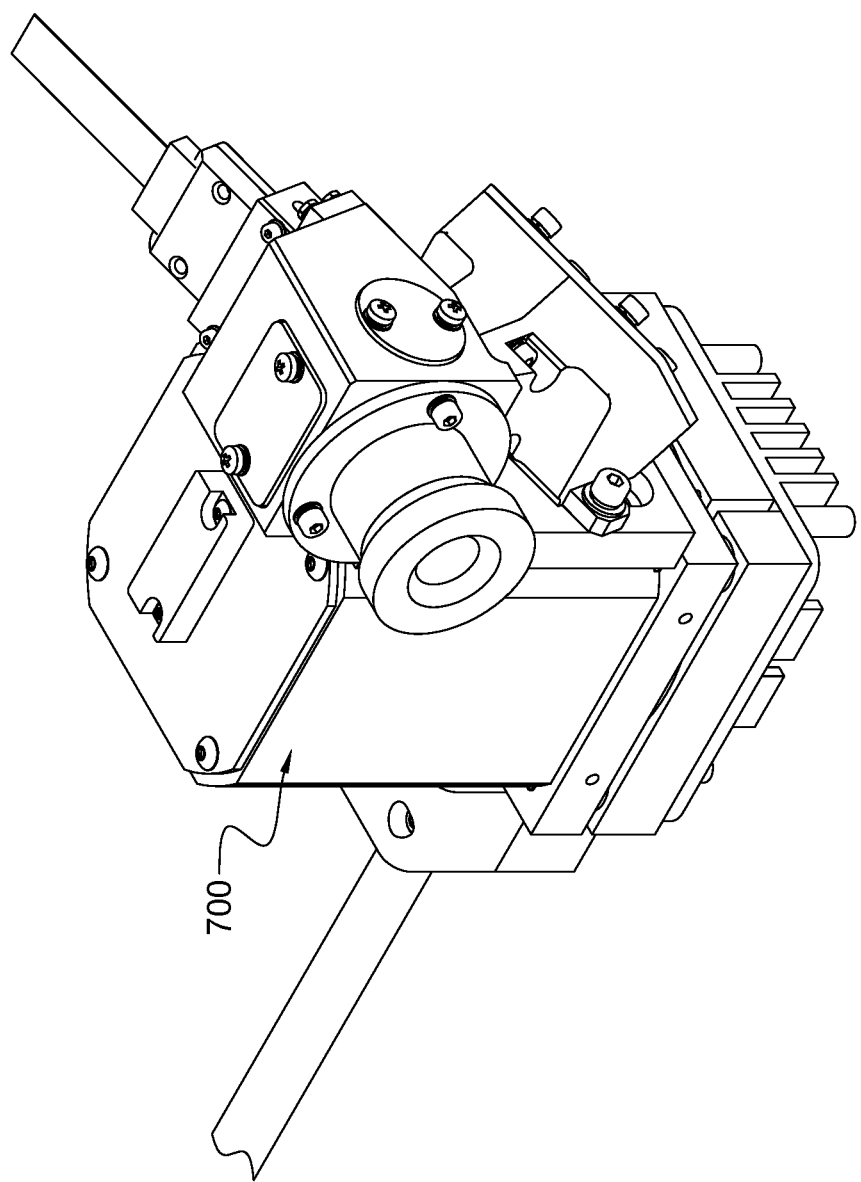
FIG. 7A depicts one assembled embodiment of an x-ray fluorescence system such as depicted in FIGS. 5A-6C, in accordance with one or more aspects of the present invention.
Figure 7D:
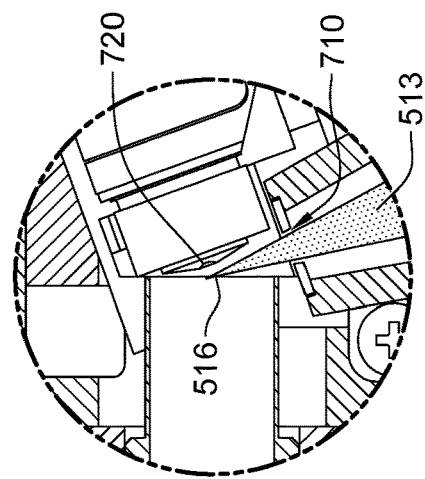
FIG. 7D is a partial enlargement of the cross-sectional elevational view of FIG. 7C, taken within line 7D thereof, in accordance with one or more aspects of the present invention.
Figure 7C:
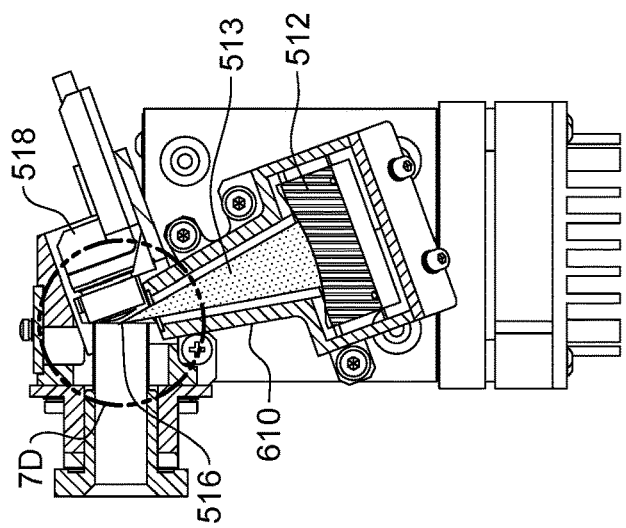
FIG. 7C is a partial cross-sectional elevational view of the x-ray fluorescence system of FIG. 7B, taken along line 7C-7C thereof, showing a close coupling of the detector to the sample, in accordance with one or more aspects of the present invention.
Figure 7B:
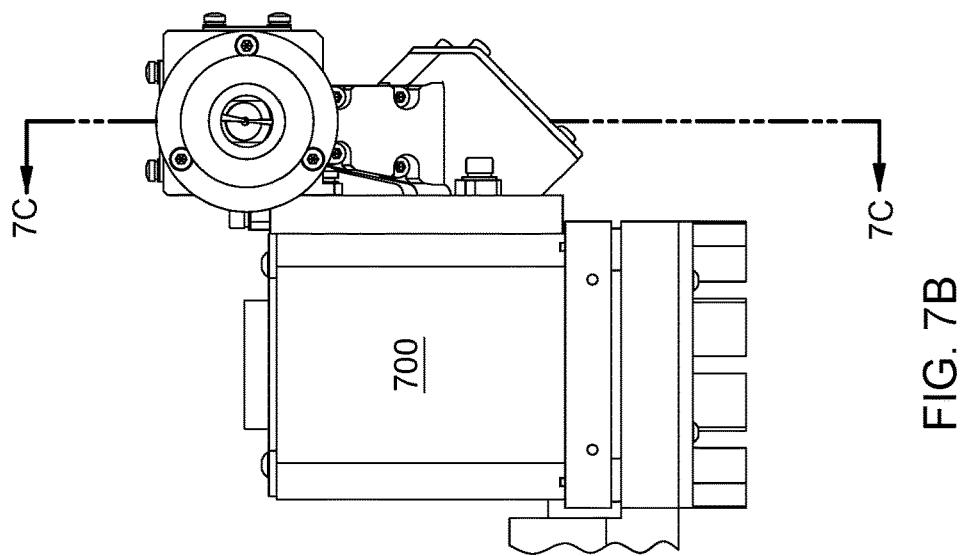
FIG. 7B is an elevational view of the x-ray fluorescence system of FIG. 7A, in accordance with one or more aspects of the present invention.

FIGS. 7A-7D illustrate further details of one embodiment of an assembled x-ray fluorescence system, or analyzer, such as discussed above in connection with FIGS. 5A-6C, in accordance with one or more aspects of the present invention. As illustrated, a housing 700 surrounds the titanium x-ray source, with the housing having an aperture aligned with a transmission window of the x-ray tube, such as described above, to allow for passage of the diverging x-ray beam. In accordance with one or more aspects of the present invention, detector 518 is closely coupled to sample 516. This is facilitated, in one embodiment by providing x-ray excitation beam 513 from optic 512 with a shallow angle of impingement on sample 516, such as illustrated in FIGS. 7C & 7D. For instance, in one or more implementations, the focusing, doubly-curved lithium fluoride (LiF) crystal optic is positioned so that x-ray excitation beam 513 impinges on the sample focal spot at an excitation angle in the range of 15° to 30°, such as in the range of 18° to 23°. In one specific example, x-ray excitation beam 513 can be oriented to impinge on the sample within an excitation angle of approximately 20°. This shallow window of x-ray excitation beam impingement on the sample allows detector 518 to be positioned at a minimum distance from the sample, in order to minimize fluorescence loss from the sample, such as to minimize air losses. For instance, in one or more embodiments, the detector is positioned relative to the sample to minimize a gap between the detector and the sample so that the collection solid angle of the detector is greater than 1 steradian, and that the transmission loss at 1.74 keV is less than 30%. In one or more embodiments, the gap is an air gap, with the minimizing air gap between the detector and sample is possible by the low-incident angle of impingement of the x-ray excitation beam on the sample, as illustrated. Further, as illustrated in FIGS. 7C-7D, the system-polarized geometry is further enhanced by the detector being positioned approximately 90° to the plane created by the excitation assembly (i.e., the source, optic and sample). In one or more embodiments, the detector is an energy dispersive detector, and a center axis of the detector to the plane created by the excitation assembly is at an angle in the range of 85° to 95°, such as approximately 90°, which helps to suppress detecting scattering from the sample. To further reduce system background noise, a tight aperture, such as aperture 710, is placed over the end of the x-ray excitation beam, as well as the detector opening 720, to minimize the impact of, for instance, argon scattering on the background of the system.

Advantageously, disclosed herein is a polarized, energy dispersive x-ray fluorescence (EDXRF) system and method. The polarized EDXRF system is achieved in two aspects. First, the excitation beam is polarized, while the divergent x-rays from the source are not polarized. To create the polarized beam, a 90° reflection/scattering is achieved, which polarizes the beam based on the electromagnetic wave property. This condition is achieved herein, in one or more embodiments, using the lithium fluoride (LiF) (200) reflection of a titanium characteristic energy (Ka line). A Bragg angle close to 45° will have a 90° reflection. In prior approaches, a scattering target with a mechanical collimator, or HOPG, combined with Rh 2.6 KeV (a close to 45° Bragg angle) can also achieve a polarized beam. However, the advantages of using a titanium x-ray source in combination with a focusing, doubly-curved LiF crystal optic, such as described herein, include: better monochromaticity; fluorescence that can travel in a 100 mm air gap with a minimum (or acceptable) loss (e.g., <10% loss); a smaller focal spot on the sample; and a good excitation energy for characterizing one or more of sodium, magnesium, aluminum, silicon, phosphorous, sulfur, or chlorine, since the scattering of 4.5 KeV from the sample is far enough from all these fluorescent lines of the elements. Second, with the excitation beam polarized, the scattering from the sample can be suppressed with the detector positioned in a way so that the center ray, or center axis of the detector, is perpendicular to the plane of the excitation assembly, including the source-to-optic-to-sample focal spot. Note that this does not mean 900 from the center axis of the excitation beam, but rather, it is perpendicular to the plane defined by the source-to-optic-to-focal spot on the sample. With these conditions being met, a polarized, EDXRF system and method such as described herein are achieved.

As will be appreciated by one skilled in the art, one or more aspects of the present invention can be embodied as a system, method or computer program product. For instance, one or more analysis aspects of the present invention can take the form of an entirely hardware embodiment, an entirely software embodiment (including firmware, resident software, micro-code, etc.) or an embodiment combining software and hardware aspects that can all generally be referred to herein as a "circuit," "module," "analyzer" or "system". Furthermore, one or more aspects of the present invention can take the form of a computer program product embodied in one or more computer readable medium(s) having computer readable program code embodied thereon.

Any combination of one or more computer readable medium(s) can be utilized. The computer readable medium can be a computer readable storage medium. A computer readable storage medium can be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain or store a program for use by or in connection with an instruction execution system, apparatus, or device.

Referring back to FIG. 1, in one example, analyzer 32 can include a computer program product including, for instance, one or more non-transitory computer readable storage media 34 to store computer readable program code means or processor/logic 33 thereon to provide and facilitate one or more aspects of the present invention.

Program code embodied on a computer readable medium can be transmitted using an appropriate medium, including but not limited to, wireless, wireline, optical fiber cable, RF, etc., or any suitable combination of the foregoing.

Computer program code for carrying out operations for one or more aspects of the present invention can be written in any combination of one or more programming languages, including an object oriented programming language, such as Java, Smalltalk, C++ or the like, and conventional procedural programming languages, such as the "C" programming language, assembler or similar programming languages. The program code can execute entirely on a user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

One or more aspects of the present invention are described herein with reference to flowchart illustrations and/or block diagrams of methods, apparatus (systems) and computer program products according to embodiments of the invention. It will be understood that one or more blocks of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing one or more functions/acts specified in the flowchart and/or block diagram block or blocks.

The flowchart and/or block diagrams in the figures illustrate the architecture, functionality, and operation of possible implementations of systems, methods and computer program products according to various embodiments of one or more aspects of the present invention. In this regard, one or more blocks in the flowchart or block diagrams can represent a module, segment, or portion of code, which includes one or more executable instructions for implementing the specified logical function(s). It should also be noted that, in some alternative implementations, the functions noted in the block can occur out of the order noted in the figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention can be provided, offered, deployed, managed, serviced, etc. by a service provider which offers management of customer environments. For instance, the service provider can create, maintain, support, etc. computer code and/or a computer infrastructure that performs one or more aspects of the present invention for one or more customers. In return, the service provider can receive payment from the customer under a subscription and/or fee agreement, as examples. Additionally or alternatively, the service provider can receive payment from the sale of advertising content to one or more third parties.

In one aspect of the present invention, an application can be deployed for performing one or more aspects of the present invention. As one example, the deploying of an application includes providing computer infrastructure operable to perform one or more aspects of the present invention.

As a further aspect of the present invention, a computing infrastructure can be deployed including integrating computer readable code into a computing system, in which the code in combination with the computing system is capable of performing one or more aspects of the present invention.

As yet a further aspect of the present invention, a process for integrating computing infrastructure including integrating computer readable code into a computer system can be provided. The computer system includes a computer readable medium, in which the computer medium includes one or more aspects of the present invention. The code in combination with the computer system is capable of performing one or more aspects of the present invention.

Although various embodiments are described above, these are only examples. Further, other types of computing environments can benefit from one or more aspects of the present invention.

As a further example, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters can also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A polarized x-ray fluorescence system comprising:
   a titanium x-ray source, the titanium x-ray source comprising a titanium target on which electrons impinge to generate a diverging x-ray beam with a titanium-based characteristic energy;
   a focusing, doubly-curved LiF crystal optic to monochromate and focus the diverging x-ray beam from the titanium x-ray source to provide a monochromated and focused x-ray excitation beam directed to impinge on a sample;
   wherein the focusing, doubly-curved LiF crystal optic and the titanium x-ray source are positioned relative to each other within the polarized x-ray fluorescence system to polarize the x-ray excitation beam; and
   a detector to receive fluorescence from the sample induced by the polarized X-ray excitation beam impinging thereon, the fluorescence being indicative of a concentration of at least one element in the sample, wherein the titanium x-ray source, doubly-curved crystal optic and sample are in a plane, and a center axis of the detector relative to the plane is within an angle to the plane in the range of 85° to 95°.

2. The x-ray fluorescence system of claim 1, wherein the focusing, doubly-curved LiF crystal optic and the titanium x-ray source operate at a Bragg angle in the range of 42° to 48° to facilitate polarization within the x-ray fluorescence system.

3. The x-ray fluorescence system of claim 1, wherein the focusing, doubly-curved LiF crystal optic includes <002>

LiF crystals which operate with the x-ray titanium source at a Bragg angle to polarize the x-ray excitation beam within the polarized x-ray fluorescence system.

4. The x-ray fluorescence system of claim 3, wherein the divergent x-ray beam from the titanium x-ray source monochromated and focused by the focusing, doubly-curved LiF crystal optic has a characteristic energy of approximately 4.5 KeV.

5. The x-ray fluorescence system of claim 3, wherein the focusing, doubly-curved LiF crystal optic comprises a logarithmic spiral doubly-curved LiF crystal, a Johann doubly-curved LiF crystal, or a Johansson-type doubly-curved crystal.

6. The x-ray fluorescence system of claim 1, wherein the focusing, doubly-curved LiF crystal optic is positioned so that the x-ray excitation beam impinges on the sample at an excitation beam angle in the range of 15° to 30°.

7. The x-ray fluorescence system of claim 6, wherein the focusing, doubly-curved LiF crystal optic is positioned so that the excitation beam angle is in the range of 18° to 23°.

8. The x-ray fluorescence system of claim 1, wherein the detector comprises an energy dispersive detector.

9. The x-ray fluorescence system of claim 1, wherein the detector is positioned relative to the sample to minimize a gap therebetween so that a collection solid angle of the detector is greater than 1 steradian, and that the transmission loss at 1.74 keVis less than 30%.

10. The x-ray fluorescence system of claim 9, wherein the gap between the detector and the sample is an air gap.

11. The x-ray fluorescence system of claim 1, further comprising x-ray shielding between the optic and the sample, the x-ray shielding having a tapered inner chamber sized and shaped to accommodate the monochromated and focused x-ray excitation beam directed to impinge on the sample.

12. The x-ray fluorescence system of claim 1, wherein the at least one element in the sample comprises at least one of sodium, magnesium, aluminum, silicon, phosphorus, sulfur, or chlorine.

13. A method of fabricating a polarized x-ray fluorescence system, the method comprising:
providing a titanium x-ray source, the titanium x-ray source comprising a titanium target on which electrons impinge to generate a diverging x-ray beam with a titanium-based characteristic energy;
positioning a focusing, doubly-curved LiF crystal optic relative to the titanium x-ray source to monochromate and focus the diverging x-ray beam from the titanium x-ray source to provide a monochromated and focused x-ray excitation beam directed to impinge on a sample;
wherein the focusing, doubly-curved LiF crystal optic and the titanium x-ray source are positioned relative to each other within the polarized x-ray fluorescence system to polarize the x-ray excitation beam;
providing a detector to receive fluorescence from the sample induced by the polarized x-ray excitation beam impinging thereon, the fluorescence being indicative of a concentration of at least one element in the sample; and
positioning a center axis of the detector relative to a plane of the titanium x-ray source, doubly-curved crystal optic and sample within an angle in the range of 85° to 95°.

14. The method of claim 13, wherein the focusing, doubly-curved LiF crystal optic and the titanium x-ray source operate at a Bragg angle in the range of 42° to 48° to facilitate polarization within the x-ray fluorescence system.

15. The method of claim 13, wherein the focusing, doubly-curved LiF crystal optic includes <002> LiF crystals which operate with the x-ray titanium source at a Bragg angle to polarize the x-ray excitation beam within the x-ray fluorescence system.

16. The method of claim 13, wherein the focusing, doubly-curved LiF crystal optic is positioned so that the x-ray excitation beam impinges on the sample at an excitation beam angle in the range of 15° to 30°.

17. The method of claim 13, wherein the detector comprises an energy dispersive detector.

18. The method of claim 13, wherein the detector is positioned relative to the sample to minimize a gap therebetween so that a collection solid angle of the detector is greater than 1 steradian, and that the transmission loss at 1.74 keV is less than 30%.

19. The method of claim 18, wherein the gap between the detector and the sample is an air gap.

20. The method of claim 13, further comprising x-ray shielding between the optic and the sample, the x-ray shielding having a tapered inner chamber sized and shaped to accommodate the monochromated and focused x-ray excitation beam directed to impinge on the sample.

* * * * *